(12) United States Patent
Dispensa et al.

(10) Patent No.: US 6,636,501 B1
(45) Date of Patent: Oct. 21, 2003

(54) HIGH-SPEED DIGITAL NETWORK NODE COMMUNICATION SYSTEM AND METHOD

(75) Inventors: Jean-Claude Dispensa, St Jeannet (FR); Denis Esteve, Vence (FR); Christophe Jourdet, Villeneuve-Loubet (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/378,454

(22) Filed: Aug. 20, 1999

(30) Foreign Application Priority Data

Dec. 11, 1998 (EP) .............................................. 98480092

(51) Int. Cl.[7] .............................................. H04L 12/28
(52) U.S. Cl. ........................ 370/351; 370/401; 370/449
(58) Field of Search ................................. 370/351, 352, 370/358, 360, 362, 363, 229, 230, 230.1, 401, 409, 449, 413, 235, 392, 395.1, 396, 395.31, 400, 408, 412

(56) References Cited

U.S. PATENT DOCUMENTS

| | | | |
|---|---|---|---|
| 5,161,152 A | * | 11/1992 | Czerwiec et al. ............... 370/4 |
| 5,602,841 A | * | 2/1997 | Lebizay et al. ............. 370/413 |
| 5,872,769 A | * | 2/1999 | Caldara et al. ............. 370/230 |
| 5,930,254 A | * | 7/1999 | Liron et al. ............. 370/238.1 |
| 6,069,895 A | * | 5/2000 | Ayandeh ..................... 370/399 |
| 6,115,713 A | * | 9/2000 | Pascucci et al. ............. 707/10 |

\* cited by examiner

*Primary Examiner*—Douglas Olms
*Assistant Examiner*—Brian Nguyen (57) ABSTRACT

A communication system speeds up digital traffic between nodes. The traffic is organized into data frames flowing over network high and low speed links attached to entry and exit ports of the nodes. Low speed modules connect the low speed links to a high speed switch. Router dispatch modules connect the high speed switch to a node attached to a high speed link for forwarding each data frame toward a dynamically selected target low speed module via the high speed switch, such that the dynamic selection of the target low speed module is based on detection of the module with the least load. At least one main router is attached to the high speed switch for storing a routing table to enable the targeted low speed module to orient one of the frames toward a right node exit port.

9 Claims, 5 Drawing Sheets

HIGH-SPEED DIGITAL NETWORK NODE COMMUNICATION SYSTEM AND METHOD

FIELD OF INVENTION

This invention deals with an improved high-speed digital network node communication system and method for speeding-up node traffic, and more particularly with a transparent modular processor architecture, particularly useful in high speed digital networks operating in an Internet environment.

BACKGROUND OF THE INVENTION to Modern digital networks operate in a multimedia environment for transporting different types of data (including pure data, i.e. files representing alphanumeric characters, as well as data representing digitized and encoded voice, image, video signals etc.). The network should naturally ensure compliance with various requirements specific to each kind of data.

Different techniques have been developed for transporting data from one location to another throughout the world. These techniques include packet switching, whereby the data are arranged into so-called packets. Those packets may either be of predefined fixed length, as in Asynchronous Transfer Mode (ATM), or be of variable length, like in Packet Type Multiplexing (PTM) mode of operation, said PTM being currently used for transporting voice data. The basic aim of both packet switching techniques is to allow a multiplexing of the different types of data over transmission links, to optimize, as much as possible, the available transmission bandwidth. Consequently, a large number of networks, both public and private, with possible interconnections, have been developed for transporting those data throughout the world.

On the other hand, the evolution of telecommunication in general, and of packet switching networks in particular, is driven by many factors among which technology evolution and application are worth being emphasized.

As far as technology is concerned, obviously considerable progress has been achieved recently with the maturing of new transmission media, e.g. optical fiber links. High speed rates can now be sustained with very low error rates. For example, very important bandwidth are profitable for long distance networks as well as for high rate local networks. Accordingly, universal use of digital technologies appeared for both private and public telecommunication networks.

With these new emerging technologies, many potential applications that were not possible in the past are now becoming accessible and attractive. In this environment, generic requirements are now expressed by the users, such as:

Improving old applications. Sub-second response times, which are achievable on low-cost personal computers, have raised user expectations so that the slow response times that were acceptable on wide area networks some years ago are no longer tolerable today. The user interface can be made better, for example, with fast response, full screen applications.

Enabling new applications. Emerging applications like graphic, image, video and multimedia processing are generating a fairly large amount of traffic. These new applications that were not feasible (or even thinkable) not too long ago are now accessible and generating an ever-increasing demand on bandwidth.

Optimizing communication networks. There is a need for rationalizing the many disparate networks that major users have. Investments can be optimized by integrating heterogeneous traffic like voice, video, and data over the same transport facilities regardless of protocols. On the other hand, users want the opportunity to control their networking cost by choosing among the different price/performance options offered by the variety of vendors and carriers and to maximize their ability to take advantage of applications built on top of disparate underlying network technologies.

Accordingly, one may have noticed an explosion in demand for high-speed digital network facilities which led to the so-called service providers (like Internet service providers or ISPs) using core backbones offering high-speed data transport facilities to large numbers of heterogeneous users' traffic, possibly through so-called "access backbones" or "core backbones". Said service providers should be transparent to users and offer fairly large communication bandwidth for lease at low cost.

For instance, service providers are now running, or expect to run, important core backbones and offer their service to users transporting traffic between distant locations throughout the world, which makes particularly sense when the user's traffic includes multimedia.

Accordingly, these core backbones may interface to both high-speed links (e.g. backbone network links) operating between 100 and 1000 Mbps, and lower-speed links operating, say, between 64 Kbps and 50 bps. This leads to traffic aggregation with a requirement for switching high to low rate traffic (and vice versa) in high speed network nodes, quite fast.

As far as this invention is concerned one may schematically envision a high speed network node as including input/output ports throuhg which the data enter/exit the node; a huge memory device for buffering data received from ports, while a node processor dynamically identifies the node exit port toward which said received data should be directed via a node switching device.

For the data being packetized, each packet includes a so-called packet header, and either a fixed length (e.g. 48 bytes) payload in Asynchronous Transfer Mode (ATM), or a variable length payload (e.g. up to 64 Kbytes), in Packet Type Multiplexing (PTM) mode. In both instances the header includes destination identification, and we shall consider that said header packet destination identification may enable defining both the considered node exit port to be used for the packet being processed, and the next network node the packet should be forwarded to, and all this, via simple table look-up.

To that end, the node memory store a so-called "routing table" dynamically filled-in during normal network traffic operation. Then, in operation, while a received packet is being buffered in the node memory, the system, by simply reading the network header and addressing the routing table accordingly, can identify the node exit port and orient the considered packet toward said exit port on a FIFO basis. But it should be noted that a routing table may include 5000 to 15000 entries, and at the high transmission rates actually being practiced, even such a simple table look-up to help matching a packet header indication with a table entry might take too long given the presently existing node processors power, while the node packet transfer should be quite fast and transparent.

This problem was already addressed and several solutions (both software and hardware solutions) have been proposed. Hardware solutions for directly pointing to the right routing table entry matching with any packet header raises some problems due to the fact that not only presently used header formats may vary, but in operation the situation might worsen with standardized header length increasing from 4 bytes long headers up to 16 bytes long headers. In addition, such hardware solutions lack flexibility to enable implementing these in currently existing networks throughout the world.

A number of software-implemented solutions to the problem have also been proposed to speed-up the table look-up operations higher and higher performance algorithms. With these implementations, while any received frame (or packet) would be conventionally buffered, the improved algorithms should enable analyzing the framed header and looking for faster matching with the routing table contents/entry. While one may expect a more flexible implementation of such software-oriented solutions into existing networks, these rather complex solutions would add to the node processor workload, which processor presently often operate in a rather serial mode. Therefore, even said soft implementable solutions to the addressed problem still lack efficiency with presently operating network node architectures.

Accordingly one may say that both available soft and hard solutions to enable faster switching of the data frames between network node entry and exit ports do not provide satisfactory means to lead toward quite fast and transparent node operation. The prior art systems thus have undesirable limitations and disadvantages.

SUMMARY OF THE INVENTION

The present invention overcomes the disadvantages and limitations of the prior art systems and provides an improved communications system and method.

One object of this invention is to provide means for improving network node operation by switching node entering frames toward appropriate node exit ports at adequately high rates.

An advantage of this invention is to provide means for improving high speed digital network node switching rates in a quasi transparent manner as seen from the network operator side.

A still further advantage of the invention is to provide means for improving high speed digital network node switching rate, said means being fully compatible with existing network node architectures.

A still further advantage of the invention is to provide a modular network node architecture dynamically implementable in existing high speed digital networks whenever required. Still another advantage of the invention is to provide an improved network node architecture selectively implementable in a high speed network core backbone operating in complex existing internetwork environments.

These and other characteristics and advantages of the present invention will be made more readily apparent from the following description of a preferred embodiment of the invention made with reference to the accompanying figures.

This invention provides an improved modular high-speed digital network node communications system and method for speeding-up node transiting traffic, said traffic being organized into so-called data frames flowing over the network high and low speed links attached to said node via node entry and exit ports, said node modular system including:

high speed switching means;
low speed modules connecting low speed links to said high speed switching means;
router dispatcher modules individually connecting said high speed switching means to a node attached high speed link for forwarding each data frame applied to the router dispatcher via an entry port, toward a dynamically selected so-called target low speed module, via said high-speed switching means;
at least one main router attached to said high speed switching means, for storing routing table information to enable said target low speed module orienting the considered frame toward the right node exit port.

DETAILED DESCRIPTION OF THE PREFERRED EMBODIMENT OF THE INVENTION

Figure 1:
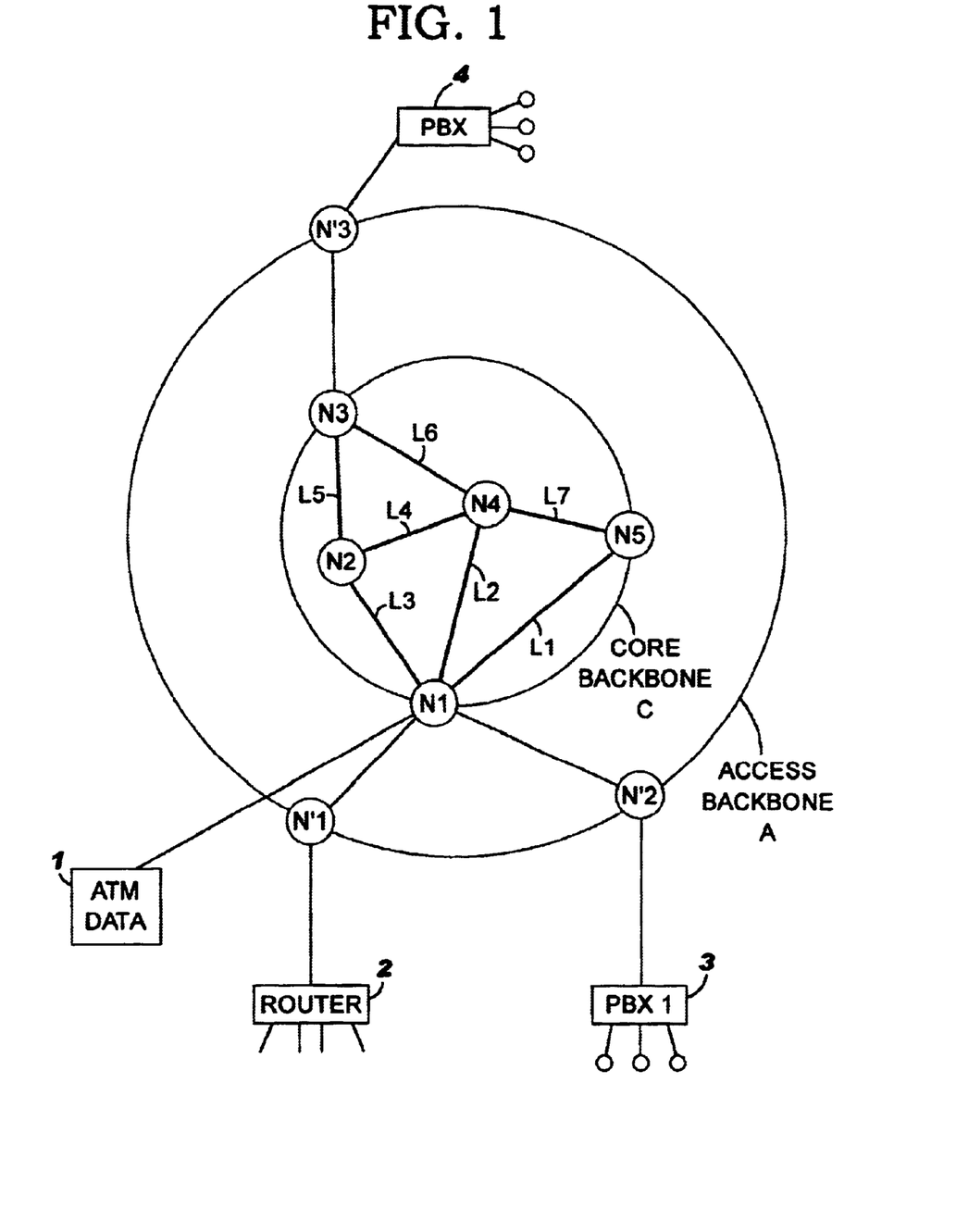
FIG. 1 is a schematic representation of a digital network including a core backbone wherein the present invention would be implemented.

FIG. 1 represents a depiction of a high speed digital network including a core backbone C with five nodes labeled N1, N2, N3, N4 and N5 interconnected by high speed links L1 through L7. The core backbone C may be used to interconnect several networks in an internet arrangement. For instance, as represented in the figure, an access backbone A is being used. As shown in FIG. 1, data source stations (labeled 1 through 4 and representing, for instance, ATM data sources, routers or PBXs, etc. . . may be attached to the backbone network either directly or via the access backbone nodes N'i, N', N'3 . . . The users' devices thus provide ATM or PTM packets/frames either directly to the core backbone nodes or via the access backbone nodes and over transmission links operating at, say, 64 Kbps and up to 50 bps. These links shall be referred to as low speed links in the following description of the invention. The core backbone links L1 through L7, herein designated as high speed links, may operate at 100 Mbps and up to 1000 Mbps when using optical fiber technologies, for instance. As far as this invention is concerned, note that the core backbone nodes shall have to switch the traffic frames from the high speed to low speed links, and vice-versa, almost transparently and as fast as possible.

As already mentioned, each data frame provided to the core backbone C, or more generally flowing over the more complex network in an internet environment, includes a fixed length frame header with a predefined structure. Said frame header structures while defined by International Standards may differ from one another but are known by the network designer(s). In any case, what is important for the present invention is to notice that the frame headers include source (origin) and destination identifying information. Based on this information, any packet (or frame) entering a node (N1 through N5), shall be oriented toward its destination (eventually via another node) by being fed into the right considered node exit port. To that end, conventional node architectures use a so-called routing table. The routing table might be dynamically filled-in during network operation, but its content may include, perhaps, 15000 entries, which makes a header-to-table entry matching system take too long as compared with the current traffic rates. In effect, during conventional operation, the node entering frames are buffered into a dedicated node memory while a node processor runs a stored algorithm to look for the frame header/Table entry match. Then, only when said match is obtained, can the buffered frame be oriented toward the right node exit port, via a node switching device. Recall that given the presently practiced traffic rates, the above matching/routing operations should be quite transparent, and operated almost instantaneous. While everyone is aware of the tremendous processor technologies improvements in terms of computing power, these improvements do not yet match the network bandwidth requirements as expressed in the field.

A solution to the problem addressed here might be based on a conventional multiprocessor arrangement and means for conventionally dispatching the node processor load to perform the required routing/dispatching operations faster. Such an implementation would, however, not provide a conceptually optimized solution to the problem addressed, particularly when bearing in mind that the solution should be transparent, i.e. meaning here implementable in any portion of an existing network, with no specific incidence on the overall network operation.

The present invention shall provide a very convenient solution to the problem addressed by defining a new flexible architecture for performing the multiprocessor function.

As it will become clear from the following description, said solution shall be based on a judiciously defined processor architecture using specialized modules interconnected via so-called switch or bus acting as interconnecting media and herein generically designated by the expression "high speed switching means". This structure shall act as a single system.

In other words, while physically operating as a multiprocessor, the system shall logically be seen from the outside as a single "box" functionally quite similar to the existing node systems. Accordingly it should be easily implementable into existing network topologies with no disturbing incidence on the network operation. Thus providing a quite transparent device, easily implementable in any of the Core Backbone nodes, for instance.

In addition, a modular conception of the system shall enable further increasing the processing power, anytime and as required, during network operation, while keeping the important transparency of the system still, as well as providing full compatibility with existing networks.

Figure 2:
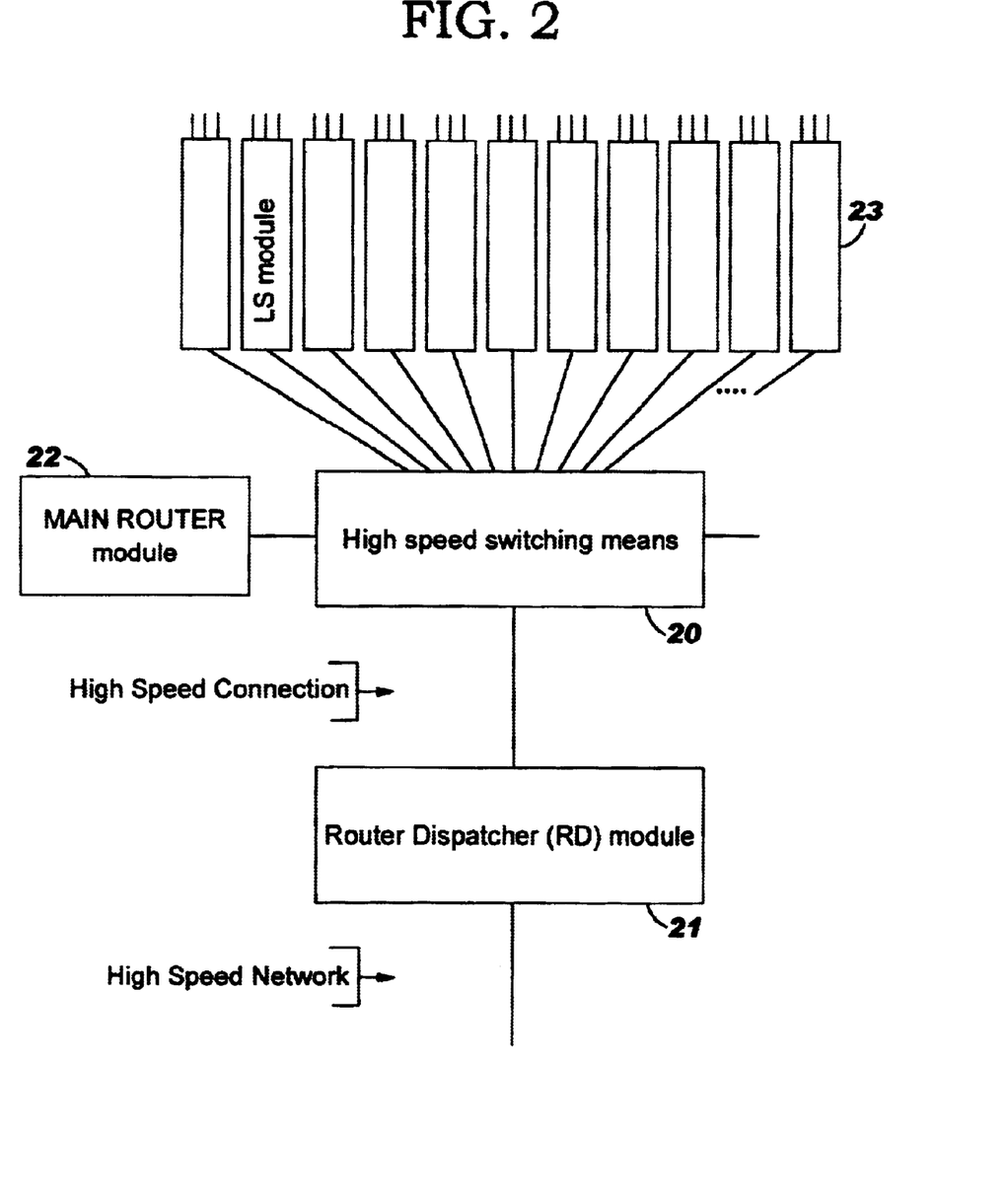
FIG. 2 is a schematic representation of the invention node system architecture.

The resulting node system considered herein may schematically be represented as shown in FIG. 2. Basically, three types of modules are depicted, which modules are interconnected via a high speed switching component 20 such as a bus or a conventional node switch. Said modules include, first a router dispatcher (RD) 21 device interfacing with a high speed network link (e.g. any of the links L1 through L7). The second module 22 is a main router module which shall run routing protocols (but may run applications too). The third type of module 23 shall be devoted to low speed routing and therefore interface with low speed links. This module may be referred to as a low speed module or blade.

The main router module 22 has no physical interface with the node external world. It is used as global node routing table depository. More particularly, the main router module 22 is devoted to conventionally building-up and maintaining up-to-date a routing table representing the current network topology as seen from the considered network node. Conventional network topology maintenance protocols involving so-called control traffic are used to that end. But, as far as this invention is concerned, one should only remember that the main router module is, herein, devoted to keeping the complete node routing table. This routing table is updated during network operation by using conventional control traffic.

The function of the router dispatcher module 21 is a less intelligent function but should be the fastest possible. Let's assume a frame is received by the router dispatcher module 21, from the RD connected high speed link. Said frame shall be oriented toward a target low speed module 23 as fast as possible. The corresponding frame dispatching operation is here only based on low speed routing modules current workloads, without even entering into the frame header content. One mode of implementation of said dispatching is herein based of a so-called polling mechanism. To that end, the router dispatcher 21 independently keeps polling the low speed modules 23 by sending a short message, at a predefined rate, and noting the respective low speed modules answering delays. The router dispatcher 21 may then keep a load table (i.e., low speed module current load) classifying said low speed modules from least to most busy or only note the least busy module. Any frame reaching the router dispatcher 21 may then be oriented toward the right target (i.e. the least busy) low speed module 23 quite fast. The router dispatcher 21 may thus dispatch the traffic entering the node from an attached high speed link with almost no delay. Jamming due to limited processor power may thus be practically avoided.

At this point one should note that since several high speed links may be attached to the considered node, each said links shall be connected to a different Router Dispatcher module. Each said modules will run its polling process independently and keep an independent "load table". Two alternatives are then possible: consolidate the different load tables into a single table, or keep these separate. Apparently the gain in operation versus complexity ratio of the consolidated load table solution would be rather low. Therefore the best mode of operation of this invention has been made with non-consolidated load tables. The process should reach a convenient balanced status.

Let's now consider the low speed module 23 receiving a frame from the router dispatcher 21 via the high speed switching component 20. Each said low speed modules is provided with a "cache" memory duplicating the main router routing table entries already used for previous received frames oriented toward the considered Low Speed module. Then, assuming the currently processed frame header addresses an entry already in the "cache" (in function of the frame destination address), then the current frame orientation toward the right node exit port runs faster since the "cache" is a sub-assembly of the main routing table. Otherwise, no cache hit occurs and then, the low speed module processor addresses the main router table and updates the cache prior to performing pushing the considered frame down to the right exit port.

But while each low speed module 23 is connected to a sub-assembly of the node connected low speed links, each low speed module 23 may maintain a full cache corresponding to the current traffic throughout the considered node. Then, each said low speed module 23 contains the table indicating the list of ports attached to the node low speed modules. Said list of ports in the considered adapter is dynamically maintained during network operation, thanks to the control traffic.

Figure 3:
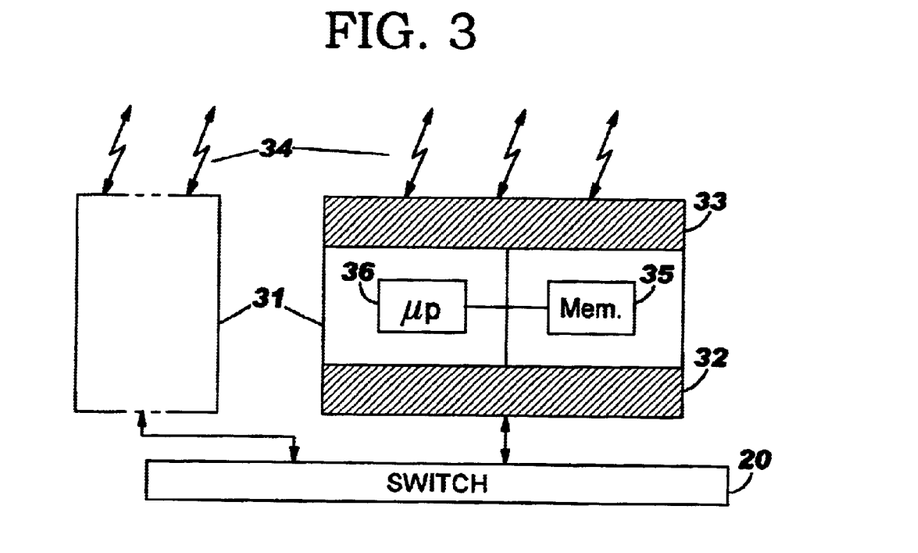
FIG. 3 show the basic elements of a network node to be considered for this invention.
Figure 4:
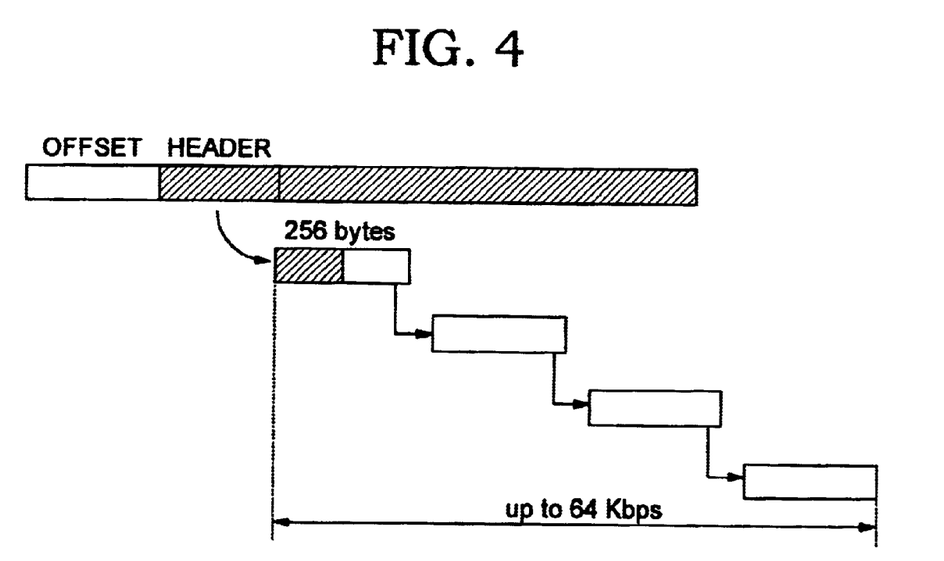
FIG. 4 show a representation of a frame being processed while operating the present invention.

Now, to take full advantage of the invention, any frame reaching a low speed module 23 and to be reoriented toward a port attached to a different Low Speed module, should not At suffer any significant additional delay since it will indicate the appropriate exit port/low speed module. FIG. 3 illustrates the process assigned to achieving that goal.

FIG. 3 shows another schematic representation of the low speed module. Shown in the figure is a low speed module 31 attached to the so-called high speed switching component (labeled 20 in FIG. 2). The low speed module 31 is schematically represented as including hardware interface equipment (32 and 33 respectively interfacing with the high speed switching component and the low speed links 34 attached to the considered low speed module. Said low speed module 31 also includes a buffer memory 35 and a microprocessor 36. The low speed module functions, as described above, are performed by the devices 35 and 36.

A packet entering low speed module 31 is stored in the memory 35, under the control of microprocessor 36, with a predefined offset. The offset field is then fed-in with the information "adapter (LS module) number; port number" as provided by the low speed module routing table and port list. More particularly, and to optimize storage in memory 35, the frame is split into sub-frames, each 256 bytes long which are concatenated as required. The best mode of implementation of this invention has been designed with concatenation provisions up to 64 Kbytes, but presently, the frames used go up to 16 Kbytes only. The offset for (adapter number; port number) indication is taken from the first concatenated sub-frame.

Now, should the designated exit port number be assigned to a different low speed module, the frame needs only be put back onto the high speed switching component 20 to be properly oriented toward the right low speed module/port, with no additional processing being required.

The node architecture defined in this invention enables also dynamically and transparently increasing node processing power by simply adding one or several "dummy" low speed module cards. The term "dummy" meaning here that said card would not be connected to any output link, thus not be assigned any exit port. It would thus be transparent from node external network viewpoint. Since, as already mentioned, the low speed modules processing is dispatched over all available low speed modules on a least loaded basis, the additional, even dummy low speed module increases the overall routing table processing power. This modular flexibility is particularly convenient in present internetworking facilities.

During network generation, the provided structure is self adapted to actual network requirements by completing the caches contents to optimize the node operating rate. Down to this point, the system was considered for operating from high link rate entry to low link rate exit. The reverse operation from low to high link rate or from low to low rate links is simpler.

When a frame enters a low speed module from an attached low rate link, the low speed module routing cache is addressed and the frame is put onto the high speed switching component 20 to be directly oriented, either toward another low speed module or toward the right high speed link via the router dispatcher module 21.

Figure 5:
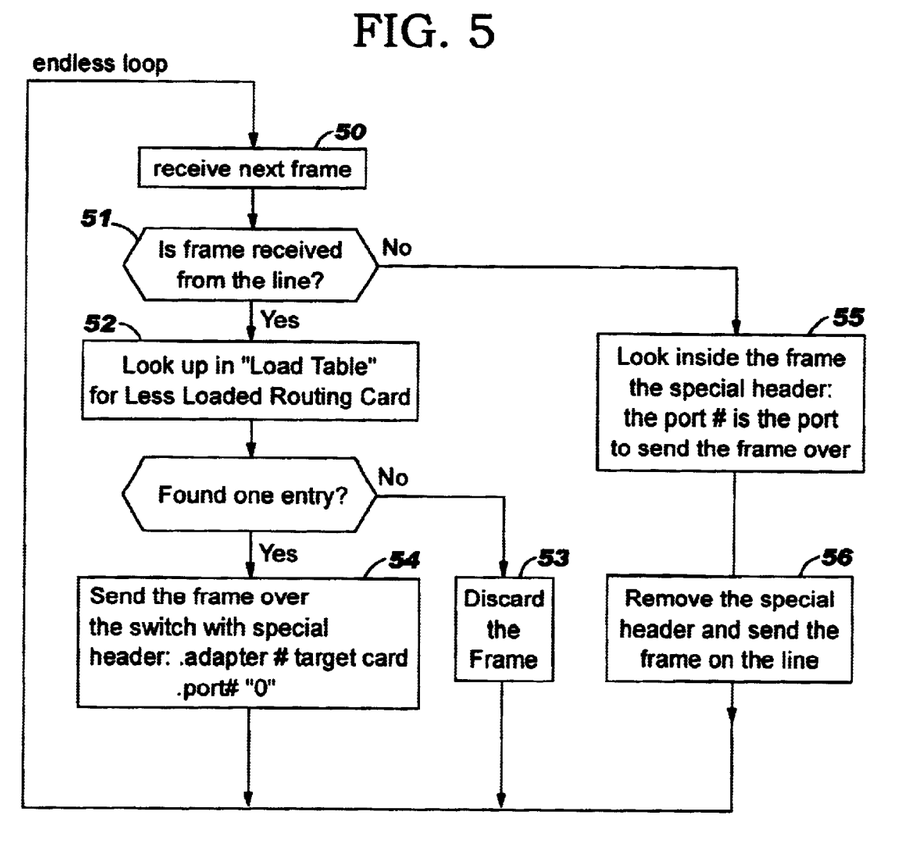
FIGS. 5 and 6 are flow-charts for implementing the present invention.
Figure 6:
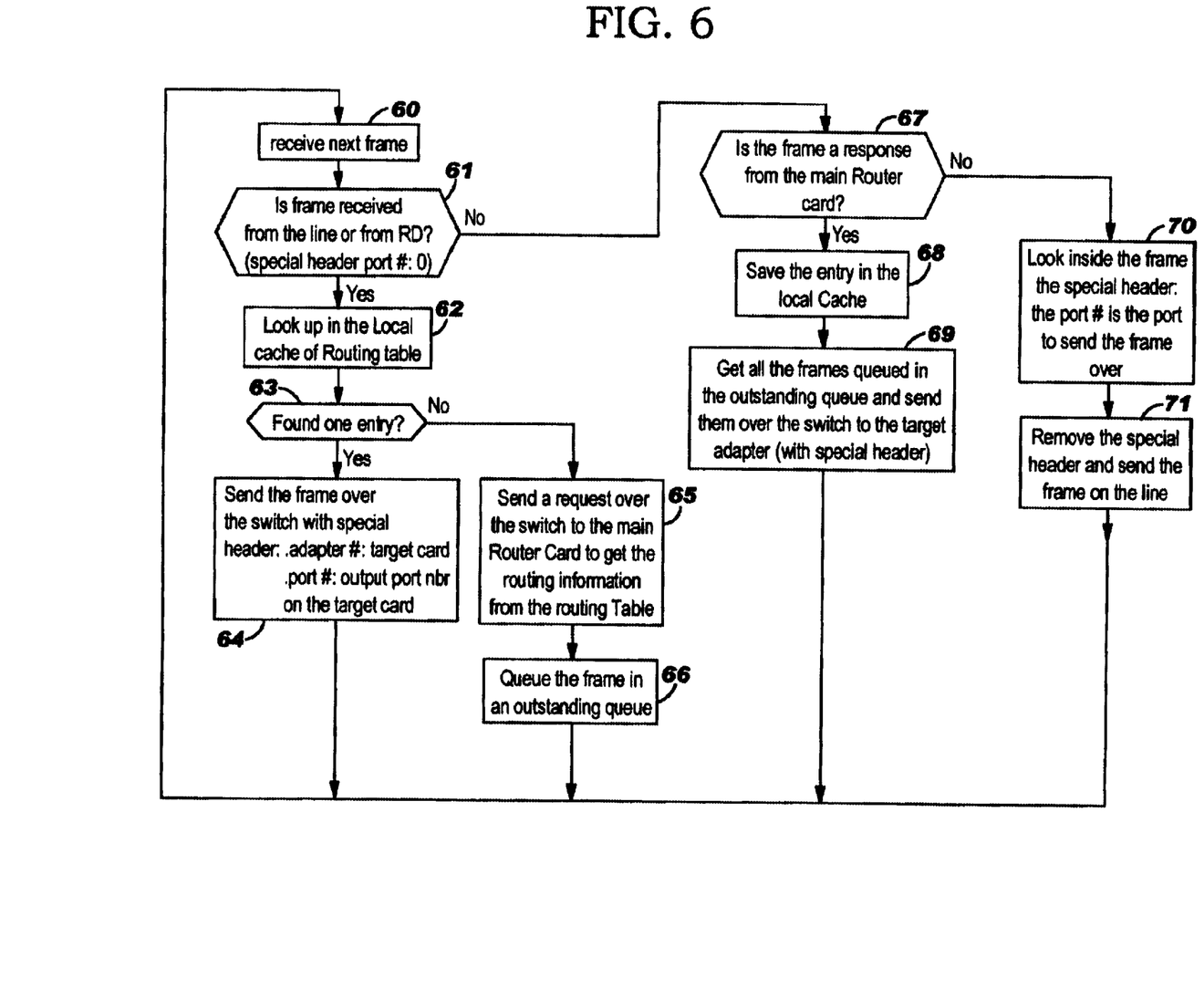

Now given the above description and the flow-charts of FIGS. 5 and 6, a man skilled in the art will be able to implement the invention without additional inventive effort being required from its part.

FIG. 5 is a flow chart for the router dispatcher module (card) operation. The system operates as an endless loop, starting with considering a received frame. Once a frame is received at block 50, a first test 51 is operated to discriminate between frames received from a high speed link (line) and others. Assuming the considered frame was, actually, received from the line or high speed link, then a router dispatcher module load table look-up operation is performed to detect the least-loaded low speed module (routing card).

It should be recalled at this point that the low speed module current load is polled and monitored at a predefined rate to keep an updated low speed module load indication in the router dispatcher. While this mechanism has not been represented in FIG. 5, a man skilled in the relevant art shall easily integrate the process to operate it in parallel with running the algorithm of FIG. 5.

Now let's go back to the flow chart of FIG. 5. If no such card is found, the frame is simply discarded 53. If an entry is found, the frame is sent over the high speed switching component 20 with an added header defining an adapter number designating the target low speed module/card, and a field for loading the exit port number, with said port field kept empty for the moment (see block 54).

Assuming the test operated in block 51 lead to a negative result, then, the frame, instead of coming from the considered high speed link attached to the router dispatcher, came from a low speed module. This may occur when processing traffic in the reverse direction i.e. from low speed link/module to high speed link attached to the router dispatcher. Then the frame header should indicate the target exit port at block 55. This header is removed 56 and the frame is sent over the node exit line. Once the operations in any of the steps 53, 54 and 56 are performed, the process loops back to step 50 looking for next frame to be processed.

Let's now consider the operations to be performed in the target low speed module, as performed according to the flow-chart of FIG. 6. Once a frame is picked-up from the high speed switching means, at block 60, a test at block 61 is performed to check whether the frame comes from an attached line, in which case no special header would be included in the frame; or from the router dispatcher via the high speed switching means(see 61); then the special header port field would include a zero number. If any of these conditions is true, then the local low speed module routing table cache is looked-up for an entry (see block 62,63).

If a looked for entry is found, the considered frame is sent over the high speed switching component (see block 64), with its special header including: an adapter number identifying the right target low speed module/card, and a port number identifying the output port on the target Low Speed card. Once these operations are performed, the system is ready for next frame and the process loops back to step 60.

But assuming no entry was found in the considered routing table cache (see negative answer to the test at block 63), then the system sends a request to the main router to get required routing information at block 65 and meanwhile, the frame is buffered in an outstanding queue at block 66 and the process loops back to steps 60 and 61.

A negative answer to the test of step 61 might deal with a response from the main router to the request at block 65 (see positive answer to test 67). In that case, the provided entry is used to update local cache 68. Then, the frames in the outstanding queue are fetched and sent to the target adapter (with special header indications) (see block 69) and the process may loop back to block 60.

But negative answers to both tests 61 and 67 might indicate that the considered frame came from another low speed module. In that case, the special header indicates the target exit port 70. The system shall then simply remove the special header and send the considered frame toward the port attached exit line (see block 71).

Of course, many modifications and adaptations to the preferred mode set forth above will be apparent to those skilled in the relevant art. Further, some of the features described herein can be used to advantage without the corresponding use of other features accordingly, the foregoing description is intended to provide a teaching of the present invention without limiting the scope of the invention which is defined solely by the claims.

Having thus describe the invention, what is claimed is:

1. A digital network node communication system for speeding-up digital traffic between nodes, said traffic being organized into data frames flowing over network high and low speed links attached to said nodes via node entry and exit ports and to be transferred from the node entry to the exit port as fast as possible, said communication system comprise:

a high speed switching component;

low speed modules connecting the low speed links to said high speed switching component;

router dispatcher modules individually connecting said high-speed switching component to a node attached to the high speed link for forwarding each data frame applied to the router dispatcher via entry port, toward a dynamically selected target low speed module, via said high-speed switching component wherein the dynamic selection of the target low speed module is base on detection of the module with the least load;

at least one main router, attached to said high speed switching component for storing a routing table to enable said target low speed module orienting one of the frames toward a right node exit port;

wherein said detection of the module with the least load, includes:

a module within one of the router dispatcher modules for independently polling the node low speed modules at a predefined rate;

a module for noting the respective polled low speed modules answering delays; and a module for keeping track of the current least answering delay into a load table.

2. The digital network node communication system, as provided in claim 1, further characterized in that each router dispatcher module within one of the nodes is provided with polling means for independently polling the nodes attached low speed modules and keeps its own independent load table.

3. The digital network node communication system as provided in claim 2, further characterized in that it includes a module for consolidating the node load tables into a node consolidated load table.

4. A digital network node communication system for speeding-up digital traffic between nodes said traffic being organized into data frames flowing over network high and low speed links attached to said nodes via node entry and exit ports and to be transferred from the node entry to the exit port as fast as possible said communication system comprising:

a high speed switching component;

low speed modules connecting the low speed links to said high speed switching component;

router dispatcher modules individually connecting said high-speed switching component to a node attached to the high speed link for forwarding each data frame applied to the router dispatcher via an entry port toward a dynamically selected target low speed module via said high-speed switching component, wherein the dynamic selection of the target low speed module is based on detection of the module with the least load;

at least one main router, attached to said high speed switching component, for storing a routing table to enable said target low speed module orienting one of the frames toward a right node exit port;

wherein each said low speed modules includes a cache representing a subset of the main router routing table, said cache being dynamically constructed during traffic operation and identifying the appropriate exit port for a given frame.

5. The digital network node communication system, as set forth in claim 4 and including at least one dummy low speed module not connected to any network link, whereby a fully transparent processing power extension is being achieved as required during network operation.

6. The digital network node communication system, as set forth in claim 5 and further characterized in that each router dispatcher module is provided with a module for running its own polling process and builds its own individual load table.

7. The digital network node communication system, as claimed in claim 6 and further including for consolidating said individual load tables into a single load table.

8. The digital network node communication system, as provided in claim 7 and further including said individual load tables are kept separate, each Router Dispatcher running is own load table independently during traffic operation.

9. The digital network node communication system, as provided in claim 4 wherein at least one of the low speed modules is provided with a buffer for storing an entering frame with a predefined offset field for storing a target node exit port reference number.

* * * * *